July 26, 1955 O. W. SMITH 2,714,016
TANDEM TRAILER DOLLY WITH ADJUSTABLE KING PIN
Filed March 29, 1954 3 Sheets-Sheet 3

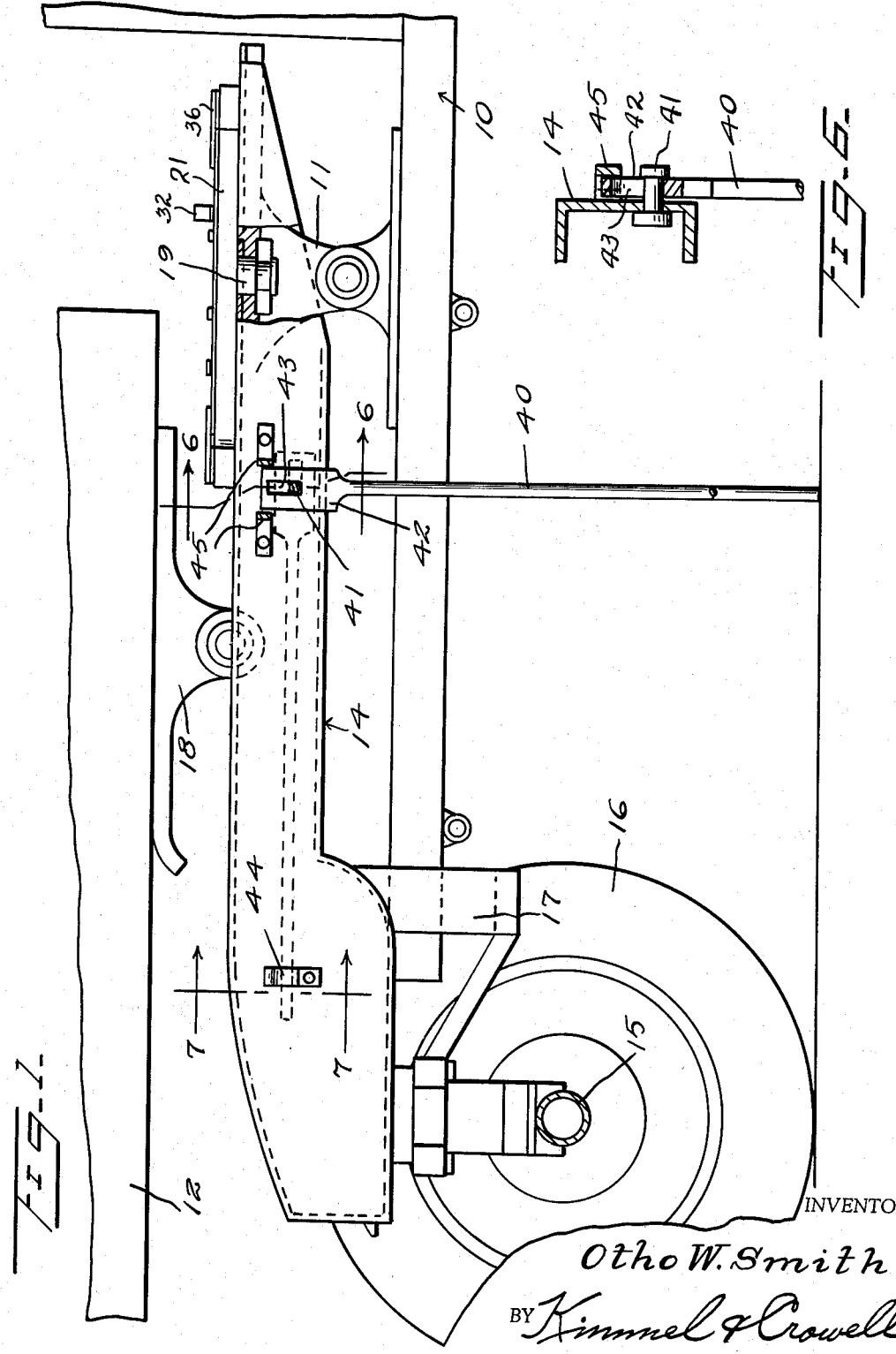

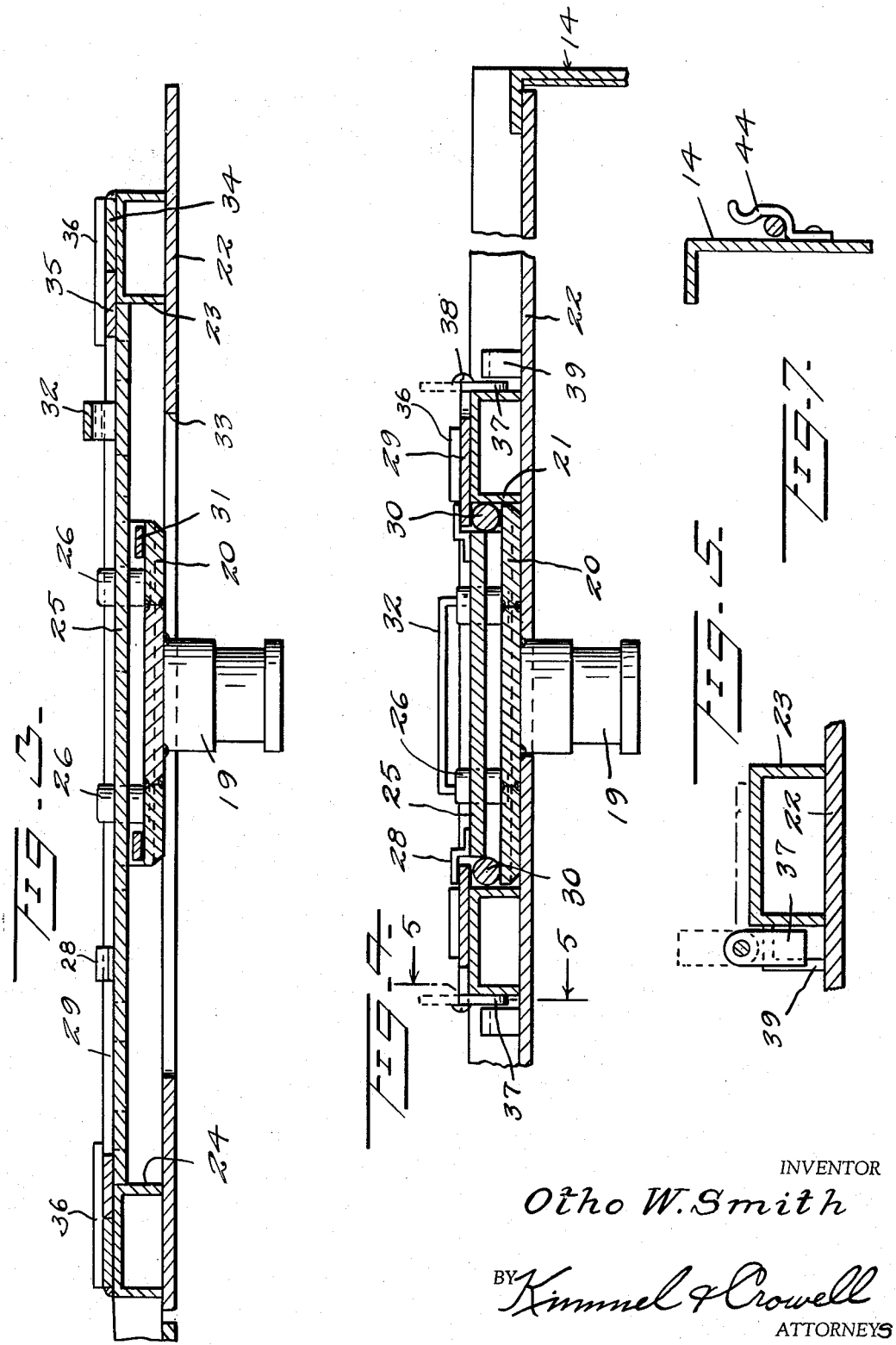

INVENTOR
Otho W. Smith
BY Kimmel & Crowell
ATTORNEYS

United States Patent Office 2,714,016
Patented July 26, 1955

2,714,016
TANDEM TRAILER DOLLY WITH ADJUSTABLE KING PIN

Otho W. Smith, Bedford, Ind.

Application March 29, 1954, Serial No. 419,503

3 Claims. (Cl. 280—418)

This invention relates to a tandem trailer device and is an improvement over the construction shown in my prior Patent No. 2,643,890, issued June 30, 1953, for Tandem Trailer Device.

An object of this invention is to provide an improved king pin mounting on the trailer connection, so that the wheels of the tandem trailer device may be longitudinally adjusted relative to the fifth wheel of the tractor and also relative to the fifth wheel with which the front of the trailer is connected.

By providing an adjustable king pin on the tandem trailer device, the device may be used with various kinds and sizes of trailers and tractors, so that where a trailer is carrying excess weight for the number of wheels and axles, an additional axle with wheels may be coupled between the trailer and tractor, and the trailer will then be brought within the maximum allowable weight per axle or wheel.

Another object of this invention is to provide a king pin adjusting means which will firmly lock in adjusted position, and the locking means can be released and adjusted without the use of tools.

A further object of this invention is to provide in an auxiliary axle assembly for mounting between a tractor and trailer, a means whereby the distance between the coupling means may be varied to accommodate trailers of different sizes with corresponding variations in the positions of the king pins on the trailer.

Another object of this invention is to permit the tandem trailer device to be coupled to tractors having different and varied king pin locations, as compared to the distance the fifth wheel is mounted from the tractor axle. Also this enables hooking the tandem trailer device to the tractor, so that the engaged part of the frame of the tractor may be inserted into the guiding frame of the tandem trailer device to eliminate jack-knifing.

With the above and other objects in view, my invention consists in the arrangement, combination and details of construction disclosed in the drawings and specification, and then more particularly pointed out in the appended claims.

In the drawings:

Figure 1 is a detail side elevation, partly broken away and in section, of a tandem trailer constructed according to an embodiment of this invention.

Figure 3 is a fragmentary sectional view taken on the line 3—3 of Figure 2.

Figure 4 is a fragmentary sectional view taken on the line 4—4 of Figure 2.

Figure 5 is a sectional view taken on the line 5—5 of Figure 4.

Figure 6 is a fragmentary sectional view taken on the line 6—6 of Figure 1.

Figure 7 is a fragmentary sectional view taken on the line 7—7 of Figure 1.

Figure 8 is a plan view of the king pin carrier embodied in this invention.

Figure 2:
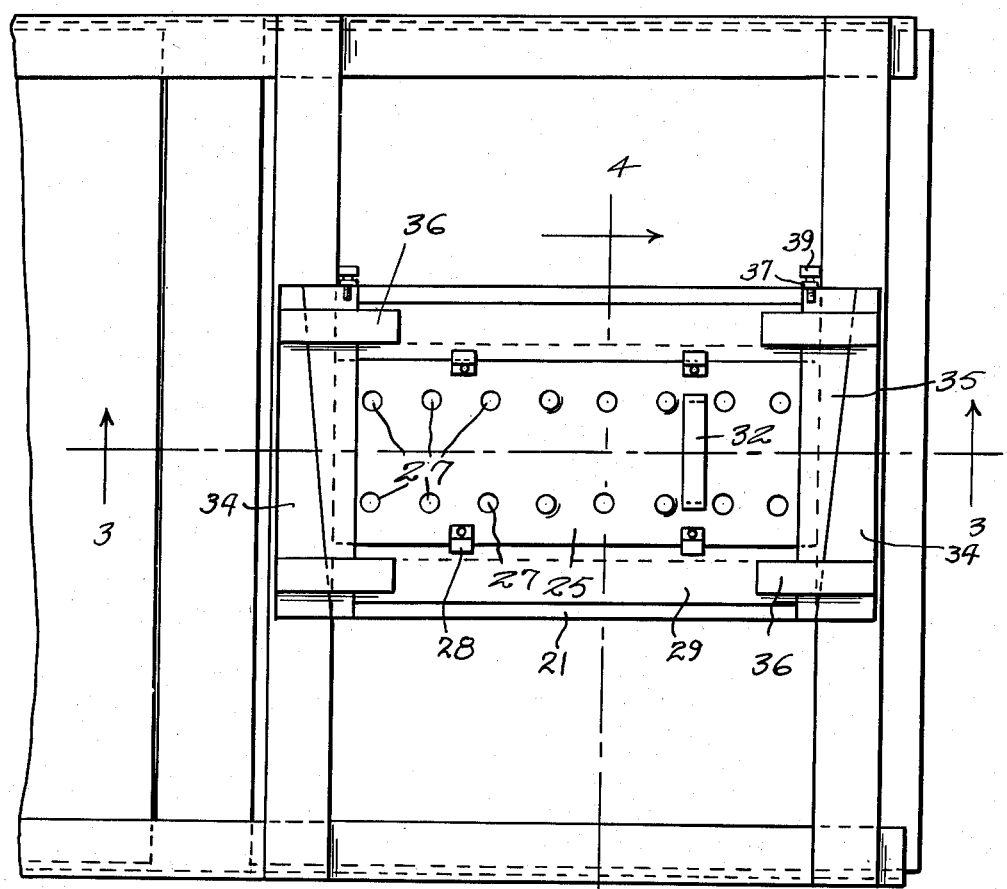
Figure 2 is a fragmentary plan view of the device.
Figure 2:
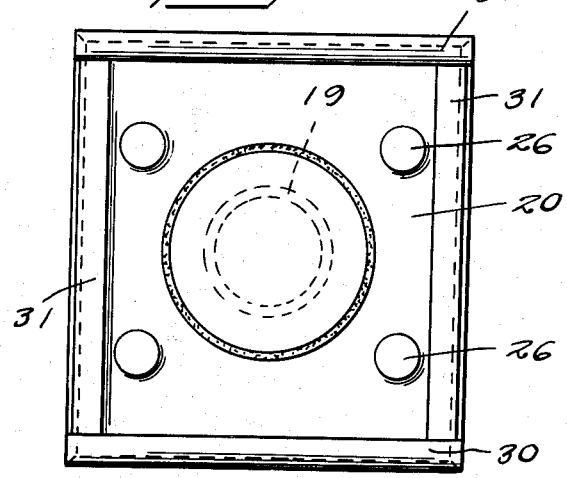

Referring to the drawings, the numeral 10 designates generally a tractor frame structure on which is mounted a fifth wheel 11. In order to provide a means whereby an additional axle may be interposed between a trailer 12 and the tractor 10, I have provided a dolly structure as will be hereinafter described.

A substantially horizontal frame 14 is adapted to extend over the rear portion of the tractor 10 and is provided with an axle 15 having wheels 16 mounted thereon. The axle 15 is disposed at the rear of the frame 14 and the frame 14 is held against horizontal turning movement relative to the frame 10 by means of depending arms 17 which project downwardly from the frame 14 and engage on the opposite side of the frame 10.

The frame 14 has mounted on the upper side thereof, at a point substantially mid-way of the length thereof, a fifth wheel 18 which is adapted to be coupled to the king pin carried by the trailer 12 in a conventional manner.

In order to provide a means whereby the dolly or auxiliary axle frame 14 may be adjustably coupled to the fifth wheel 11 so as to dispose the axle 15 and the wheels 16 at a predetermined position forwardly or rearwardly of the wheels of the tractor 10, I have provided a king pin 19 which is carried by a plate 20. The king pin 19 is adapted to be connected with the fifth wheel 11 in a conventional manner, and the king pin 19 with plate 20 is adjustable lengthwise of the frame 14, as will be hereinafter described.

A pair of longitudinally disposed guide channel members 21 are secured to the top plate 22 of the frame 14 and the king pin plate 20 loosely engages between the inner edges of the channel members 21.

Forward and rear cross channel members 23 and 24, respectively, are secured across the forward and rear ends of the longitudinal channels 21, and a rectangular keeper plate 25 is adapted to removably engage between the channels 21, 23, and 24.

The plate 20 has secured thereto pairs of upstanding studs or pins 26 which are adapted to engage in selected apertures 27 which are formed in the keeper plate 25. The plate 25 has secured to the upper side thereof outwardly projecting clips 28 which are engageable over the upper sides of plates 29 which are welded to the upper sides of the longitudinal guide channels 21 and project over the plate 20. The plate 25 has a width such as to loosely engage through the space between the inner edges of the plates 29.

The king pin carrier plate 20 has fixed thereto a pair of rods 30 to prevent upward movement of the plate 20, and plate 20 also has fixed thereto a pair of front and rear bars 31 on which the plate 25 is adapted to engage. Plate 25 has fixed to the upper side thereof a handle 32 so that plate 25 may be lifted up to permit the longitudinal adjustment of king pin plate 19. The top plate 22 is provided with an elongated opening 33 through which the ping pin 19 loosely engages so that king pin 19 may be lengthwise adjusted.

In order to provide a means whereby keeper plate 25 may be locked, I have provided a pair of stationary end wedges 34 which are fixed to the upper sides of the channels 23 and 24. A pair of flat wedges 35 are engageable over the channels 23 and 24 and abut against the ends of the plates or bars 29. A pair of straps 36 are welded to the upper sides of plates 29 and stationary wedges 34 so that the removable wedges or locking members 35 will be held against upward movement.

The wedges 35 are releasably locked in wedging position by means of pivoted locking bolts 37 which are secured by fastening means 38 to the large ends of the wedges 35. The locking members 37, as shown in Figure 4, gravitatingly swing downwardly to a locking position confronting the outer sides of the longitudinal channels 21, and a keeper member 39 of angular shape is welded between the top plate 22 and the adjacent outer side of a channel 21.

When the dolly or auxiliary axle structure is uncoupled from the tractor 10 and the trailer 12, the frame 14 is supported in substantially horizontal position by means of a pair of supporting legs or bars 40 which are pivotally mounted on pins 41 carried by the frame 14. The upper end of each leg 40 is flattened out, as indicated at 42, and the flat portion 42 is provided with an elongated opening 43 through which the pin 41 loosely engages.

The elongated opening 43 provides a means whereby the leg 40 may be locked in operative depending position and may be swung upwardly to a horizontal position engaging a resilient clip 44 secured to the outer side of frame 14. A keeper 45 is secured to the outer side of frame 14 so that, as shown in Figures 1 and 6, when the leg 40 is in operative position the upper end of the flat portion 42 will be engaged in the keeper 45.

Leg 40 is released from keeper 45 by raising the frame 14 upwardly a short distance to permit downward movement of the leg 40 out of the keeper 45 and then leg 40 may be swung upwardly and rearwardly for engagement with clip 44.

In the use and operation of this dolly or auxiliary axle, the king pin 19 is engaged with fifth wheel 11 on the rear of the tractor 10. The longitudinal adjustment of the frame 10 is accomplished by pulling out wedges 35 and raising keeper plate 25 off of the locking pins 26. King pin 19 may then be adjusted forwardly or rearwardly in the guide formed by the longitudinal channels 21.

When king pin 19 is longitudinally adjusted as may be desired to position the rear axle 15 and wheels 16 in the selected position relative to the rear axle and wheels of tractor 10, keeper plate 25 may be inserted over locking pins 26 and locked at the ends thereof by the wedges 35 which project over the ends of keeper plate 25, as shown in Figure 3. The wedges 35 are locked against release by the gravity locking members 37 which engage between the outer sides of longitudinal channels 21 and keepers 39.

The dolly structure hereinbefore described will provide a means whereby an additional axle with wheels may be coupled between a tractor and trailer so that an additional weight may be carried by the trailer and the weight will conform to the State regulations as to the number of axles for predetermined weight loads.

What is claimed is:

1. A dolly construction for interposing an auxiliary axle between a tractor and trailer, comprising a frame of substantially L-shape having a horizontal side and a vertical depending side, an axle carried by said vertical side, wheels on said axle, a fifth wheel member carried by said horizontal side between the ends thereof, a king pin adapted for connection with the fifth wheel of the tractor, a longitudinally extending guide carried by said horizontal side of said frame, a plate fixed to said king pin and engaging said guide, locking means carried by said plate, and a keeper plate engaging said guide and immovable relative thereto for association with said locking means on said first named plate for locking said first named plate in longitudinally adjusted position.

2. A dolly construction for interposing an auxiliary axle between a tractor and a trailer, comprising a frame of substantially L-shape having a horizontal side and a vertical depending side, an axle carried by said vertical side, wheels on said axle, a fifth wheel member carried by said horizontal side between the ends thereof, a king pin adapted for connection with the fifth wheel of the tractor, a longitudinal guide carried by said frame, a plate fixed to said king pin engaging said guide, an elongated keeper plate having a plurality of openings engaging said guide, upstanding locking pins carried by said first-named plate engageable in selected openings of said keeper plate whereby said king pin may be locked in longitudinally adjusted position with respect to said frame, and means releasably securing said keeper plate relative to said guide.

3. A dolly construction for interposing an auxiliary axle between a tractor and a trailer, comprising a frame of substantially L-shape having a horizontal side and a vertical depending side, an axle carried by said vertical side, wheels on said axle, a fifth wheel member carried by said horizontal side between the ends thereof, a king pin adapted for connection with the fifth wheel of the tractor, a longitudinal guide carried by said frame, a plate fixed to said king pin engaging said guide, an elongated keeper plate engaging said guide and having a plurality of openings, upstanding locking pins carried by said first-named plate engageable in selected openings of said keeper plate, and a pair of wedges engageable with said guide and said keeper plate for locking said keeper plate to said guide.

References Cited in the file of this patent

UNITED STATES PATENTS

| | | |
|---|---|---|
| 2,495,943 | Peterson | Jan. 31, 1950 |
| 2,589,678 | De Lay | Mar. 18, 1952 |
| 2,643,890 | Smith | June 30, 1953 |
| 2,682,420 | Chelf | June 29, 1954 |